United States Patent
Wang et al.

(10) Patent No.: US 12,019,199 B2
(45) Date of Patent: Jun. 25, 2024

(54) INTERPOLATION METHOD AND SYSTEM TO OBTAIN AZIMUTHAL BOREHOLE SONIC MEASUREMENTS

(71) Applicant: Halliburton Energy Services, Inc., Houston, TX (US)

(72) Inventors: Ruijia Wang, Houston, TX (US); Denis Schmitt, Houston, TX (US); Xiang Wu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 395 days.

(21) Appl. No.: 17/467,744

(22) Filed: Sep. 7, 2021

(65) Prior Publication Data
US 2023/0084254 A1    Mar. 16, 2023

(51) Int. Cl.
*G01V 1/50* (2006.01)
*E21B 49/00* (2006.01)
*G01V 1/04* (2006.01)
*G01V 1/16* (2006.01)

(52) U.S. Cl.
CPC ............... *G01V 1/50* (2013.01); *E21B 49/00* (2013.01); *G01V 1/04* (2013.01); *G01V 1/162* (2013.01); *G01V 2210/1299* (2013.01); *G01V 2210/1429* (2013.01); *G01V 2210/43* (2013.01); *G01V 2210/60* (2013.01)

(58) Field of Classification Search
CPC . G01V 1/50; G01V 1/04; G01V 1/162; G01V 2210/1299; G01V 2210/1429; G01V 2210/43; G01V 2210/60; G01V 1/44; G01V 1/48; G01V 2210/622; G01V 2210/6222; E21B 49/00; E21B 47/0224
See application file for complete search history.

(56) References Cited

U.S. PATENT DOCUMENTS

| | | |
|---|---|---|
| 4,760,563 A | 7/1988 | Beylkin |
| 4,817,059 A | 3/1989 | Hornby et al. |
| 5,402,392 A | 3/1995 | Lu et al. |
| 5,678,643 A | 10/1997 | Robbins et al. |

(Continued)

OTHER PUBLICATIONS

Search Report and Written Opinion issued for International Patent Application No. PCT/US2021/049213, dated May 26, 2022, 13 pages.

(Continued)

*Primary Examiner* — Kyle R Quigley
(74) *Attorney, Agent, or Firm* — John Wustenberg; C. Tumey Law Group PLLC

(57) ABSTRACT

Multicomponent data are acquired using a downhole acoustic tool having transmitters and receiver stations distributed azimuthally in a plane perpendicular to the axis of the tool. The receiver stations are located at several receiving stations along the axis of the tool. At each acquisition depth, waveforms are processed through a multi-dimensional fast Fourier transform, extrapolation and inverse multi-dimensional fast Fourier transform. At each receiver station, waveforms are combined to produce the standard monopole waveforms and the inline and crossline dipole waveforms along fixed azimuths. These oriented waveforms produce a finer azimuthal sampling of the surrounding formation, and can then be used for imaging geological features within the surrounding formation.

20 Claims, 8 Drawing Sheets

(56) References Cited

U.S. PATENT DOCUMENTS

| | | | |
|---|---|---|---|
| 5,899,958 | A | 5/1999 | Dowell et al. |
| 6,084,826 | A | 7/2000 | Leggett, III |
| 6,568,486 | B1 | 5/2003 | George |
| 6,956,790 | B2 | 10/2005 | Haldorsen |
| 7,035,165 | B2 | 4/2006 | Tang |
| 7,492,664 | B2 | 2/2009 | Tang et al. |
| 8,055,448 | B2 | 11/2011 | Mathiszik et al. |
| 8,521,433 | B2 | 8/2013 | Hirabayshi et al. |
| 9,529,109 | B2 | 12/2016 | Bennett et al. |
| 10,613,242 | B2 | 4/2020 | Hirabayashi |
| 10,712,462 | B2 | 7/2020 | Hirabayashi |
| 10,768,329 | B2 | 9/2020 | Hirabayashi et al. |
| 10,890,682 | B2 | 1/2021 | Hirabayashi |
| 2009/0205899 | A1 | 8/2009 | Geeritis et al. |
| 2011/0161009 | A1* | 6/2011 | Wang ............... G01V 5/04 702/9 |
| 2012/0046871 | A1 | 2/2012 | Naville et al. |
| 2012/0109528 | A1 | 5/2012 | Bolshakov et al. |
| 2016/0356909 | A1 | 12/2016 | Zhou |
| 2018/0003843 | A1* | 1/2018 | Hori ............... G01V 1/52 |
| 2018/0284309 | A1 | 10/2018 | Hirabayashi et al. |

OTHER PUBLICATIONS

Akinose O., Ali R., Kumar R., and Donald J.A, 2021. Introducing sonic imaging with a slim dipole measurement in high angle wells. Presented at the 62nd SPWLA Annual Logging Symposium. SPWLA-2021-0100.

Bennett N., Donald J.A., Ghadiry S., Nassa M., Kumar R. and Biswas R., 2019. Borehole acoustic imaging using 3D STC and ray tracing to determine far-field reflector dip and azimuth. Petrophysics, vol. 60, 335-347.

Bennett, N., 2019. 3D slowness time coherence for sonic imaging. Geophysics, vol. 84, 5, D179-D189.

Bing, W., Tao, G., Hua, W. and Bolei T., 2011. Extracting near-borehole P and S reflections from array sonic logging data. J. Geophys. Eng., 8, 308-315. (f-k filtering for extraction. Monopole data).

Bolshakov, A., Patterson, D. and Lan C., 2011. Deep fracture imaging around the well bore using dipole acoustic logging. Paper SPE-146769. (Case studies).

Bradley, T., Patterson, D. and Tang, X.M., 2011. Applying a through casing imaging technique to identify gas migration paths in a salt body. First break, 29, 75-84.

Burridge, R., Chang C. and Chen Y.-H., 2009. Modeling sonic imaging of plane layering from an oblique borehole. Presented at the SEG Intl. Meeting. (Modeling based on Lee and Bach for radiation consideration).

Chabot, J.R., Henley, L., Brown D. and Bancroft., J.C., 2002. Single well imaging using full waveform sonic data: an update. Presented at the SEG Intl Meeting. (P-wave. Equivalent offset migration).

Chabot, L., Brown, J.R., Henley, D. and Bancroft., J.C., 2001. Single well imaging using full waveform sonic data. Presented at the SEG Intl Meeting. (P-wave. Equivalent offset migration).

Chabot, L., Brown, J.R., Henley, D. and Bancroft., J.C., 2002. Single well imaging using full waveform sonic data. CREWES Research Report, 14, 1-14. (P-wave. Equivalent offset migration).

Chang, C., Hoyle, D., Watanabe, S., Coates, R., Kane, M., Esmersoy, C., Foreman, J., 1998. Localized maps of the subsurface. Oilfield Review, Spring Issue, p. 56-66.

Coates, R., Kane, M., Chang, C., Esmersoy, C., Fukuhara M. and Yamamoto, H., 2000. Single-well sonic imaging: high-definition reservoir cross-sections from horizontal wells. SPE/Petroleum Society of CIM 65457.

Collins, M., 2012. Methodology for analytic estimation of fast shear polarization direction in HTI formations. Paper SPE-161085-MS.

Esmersoy, C., Chag, C., Kane, M., Coates, R., Tichelaar, B. and Quint, E., 1998. Acoustic imaging of reservoir structure from a horizontal well. The Leading Edge, 940-946.

Esmersoy, C., Chang C., Kane, M.R., Coates, R.T., Dodds, K. and Foreman, J., 1997. Sonic imaging: a tool for high resolution reservoir description. SEG Ann. Int. Mtg. and Exp. Expanded Abstracts p. 278-281.

Fortin, J.P., Rehbinder, N., and Staron, P., 1991. Reflection imaging around a well with the EVA full waveform tool: Log Analyst, May-June, 271-278.

Franquet, J., Patterson, D. and Moos, D., 2011. Advanced dipole borehole acoustic processing: rock physics and Geomechanics. Presented at the SEG Intl. Meeting. (shear anisotropy: fractures and stress, fracture detection with Stoneley, radial shear wave velocity, dipole imaging of fractures not intersecting the borehole).

Haldorsen, J., Voskamp, A., Thorsen, R., Vissapagada, B., Williams, S. and Fejreskov M. 2006. Borehole acoustic reflection survey for high resolution imaging. Presented at the SEG Intl. Meeting. (BARS application. P-wave all azimuths).

Hirabayashi N. and Leaney W.S., 2019. Wavefield separation for borehole acoustic reflection survey using parametric decomposition and waveform inversion. Geophysics, vol. 84, 4, D151-D159.

Hirabayashi N., 2018. Reflector imaging using trial reflector and crosscorrelation: application to fracture imaging for sonic data. Geophysics, vol. 81, 6, S433-S446.

Hirabayashi N., 2021. Beamform processing for sonic imaging using monopole and dipole sources. Geophysics, vol. 86, 1, D1-D14.

Hirabayashi N., Sakiyama N. and Ikegami T., 2017. Characteristics of waveforms recorded by azimuthally spaced hydrophones of sonic logging tool for incident plane waves. Geophysics, vol. 82, 6, D353-D368.

Hirabayashi, N., Leaney, W.S. and Haldorsen, J.B. 2008. Wavefield separation for borehole acoustic reflection surveys using parametric inversion. Presented at the SEG Intl. Meeting (Monopole).

Hirabayashi, N., Torii, K, Yamamoto, H., Haldorsen, J.B. and Voskamp, A., 2010. Fracture detection using borehole acoustic reflection survey data. Presented at the 2010 SEG Intl. Meeting. (Use of slip boundary conditions and converted waves from MSIP monopole).

Hornby, B.E., 1988. Imaging of near-borehole structure with the Array Sonic Tool. 58th SEG Annual International Meeting and Exposition Expanded Abstracts, 124-128.

Hornby, B.E., 1989. Imaging of near-borehole structure using full-waveform sonic data: Geophysics, 54,747-757.

Jervis, M., Bakulin, A., Tonellot, T.L., Ghamdi, I., Shabbir A., Yamamoto, H. 2012. High resolution seismic imaging from a single borehole to detect a nearby well. Presented at the SEG Intl. Meeting. (MSIP monopole data).

Li, J, Tao, G., Zhang, K. and Ye, Q., 2013. Borehole sonic reflection imaging by finite difference reverse time migration. Presented at the SEG Intl. Meeting. (MSIP data. P-wave with different azimuths).

Li, Y., Zhou, R., Tang, X., Jackson, J.C., Patterson, D.J.2002. Single well imaging with acoustic reflection survey at Mounds, Oklahoma, USA. Paper Z-99 presented at the EAGE Intl. Meeting.

Maia, W., Rubio, R., Junior, F., Haldorsen, J., Guerra R. and Dominguez, C. 2006. First borehole acoustic reflection survey mapping a deep water turbidite sand. Presented at the SEG Intl. Meeting. (P-wave. Mapping top and bottom of sand unit).

Paternoster, B., and Larrère, M., 1985. Effects of layer boundaries on FWAL and dip estimation (oblique events). In Full Waveform Acoustic Logging Consortium annual report, Earth Resources Laboratory, Massachusetts Institute of Technology, p. 153-192.

Patterson, D., Mekic, N., Bolshakov, A., Harrison, C., Tang, X.M., 2013. Unconventional reservoir fracture evaluation utilizing deep shear-wave imaging. Paper IPTC 16958 (case studies).

Patterson, D., Tang, X.M., and Ratigan J., 2008b. High resolution borehole acoustic imaging through a salt dome. Presented at the SEG Intl Meeting. (P-wave).

Patterson, D., Tang, X. and Ratigan, J., 2008a. Mapping structural geology from solution mined storage cavern wellbores for selecting casing and leaching string depths. Presented at the 2008 SMRI Technical Conference. (P-wave, salt dome imaging). (Unable to obtain PDF copy of document).

Schmitt, D.P. and Tonnelot, T.-L., 2020. Wellbore far-field imaging for high resolution reservoir characterization. IPTC-19708-MS.

(56) References Cited

OTHER PUBLICATIONS

Srivastava, A., Yamamoto H., Shabbir, A., Roberts, J., Cantin, F., Moreau, O.-D. and Bounoua, Nourreddine, 2014. Dipole shear imaging behind casing: extending the borehole acoustic imaging envelope to Brown fields. Paper IPTC-17537.

Tang, X. and Patterson, D., 2009a. Shear-wave imaging using cross-dipole acoustic logging tool. Presented at the SEG Intl Meeting. (Distinction between SV and SH and azimuth estimation).

Tang, X., 2003. Imaging near borehole structure using directional acoustic wave measurement. Presented at the SEG Int. Meeting. (Determination of reflector azimuth. P-wave from dipole source).

Tang, X., Bolshakov, A. and Patterson, D., 2010. Integrated acoustic evaluation of reservoir fractures: from borehole out into the formation. (Stoneley for fractures plus shear wave imaging). Presented at the SPWLA. Paper No. SPWLA-2010-30674.

Tang, X., Glassman, H. and Patterson, D. 2007b. Single well acoustic imaging in anisotropic formation. Presented at the SEG Intl. Meeting. (Migration in TI. P-wave).

Tang, X., Glassman, H. and Patterson, D. 2008. Single well acoustic imaging in anisotropic formation. Geophysics, 73 (4), D11-D16. (Migration in TI. P-wave).

Tang, X.M., 2004. Imaging near borehole structure using directional acoustic wave measurement. Geophysics, 69, (6), 1378-1386. (Shear wave. Anisotropy. Determination of reflector's azimuth).

Tang, X.M., Cao, J.J. and Wei, Z-T., 2013. Reciprocity in the radiation and reception of shear waves from a borehole dipole source and its application to fast simulation of shear-wave reflection survey. Presented at the SEG Intl. Meeting.

Tang, X.M., Cao, J.J. and Wei, Z-T., 2014. Shear wave radiation, reception and reciprocity of a borehole dipole source with application to modeling of shear wave reflection survey. Geophysics, 79 (2), T43-T50.

Tang, X.M., Zheng, Y. and Patterson, D., 2006. Processing acoustic logging data to image near borehole geological structures. Presented at the SEG Intl Meeting (Separation with transmitter array).

Tang, X.M., Zheng, Y. and Patterson, D., 2007a. Processing acoustic logging data to image near borehole geological structures. Geophysics, 72 (2), E87-E97 (Separation with transmitter array. LWD top and bottom).

Tang., X.M. and Patterson, D.J. 2009b. Single-well S-wave imaging using multicomponent dipole acoustic log data. Geophysics, 74 (6). WCA211-WCA223. (SV vs. SH wave, anisotropy).

Tiexuan, Z. Tao, G., Junjun, L., Bing, W., and Hua, W. 2009. Application of the equivalent offset migration method in acoustic log reflection imaging. Applied Geophysics, 6 (4), 303-310. (P-wave data).

Utard, M., Naville, C. and Rehbinder, N., 1984. Study of reflected events observed on microseismograms recorded with the EVA acoustic logging system. Paper 10 of the SPWLA Paris Chapter (SAID) annual meeting. (Unable to obtain PDF copy of document).

Wei, Z-T and Tang, X.M., 2012. Numerical simulation of radiation, reflection and reception of elastic waves from a borehole dipole source. Geophysics, 77 (6), D523-D261.

Yamamoto, H. Watanabe, S., Koelman J.M.V., Geel, J., Brie, A., Fujii, K. and Coates, R., 2000. Borehole acoustic reflection survey experiments in horizontal wells for accurate well positioning. SPE/ Petroleum Society of CIM 65538.

Yamamoto, H., Haldorsen, J.B., Mikada, H. and Watanabe, S., 1999. Fracture imaging from sonic reflections and mode conversion. SEG 1999 Expanded Abstracts. p. 148.

Zheng, Y and Tang, X., 2005. Imaging near-borehole structure using acoustic logging data with pre-stack F-K migration. Presented at the SEG Intl. Meeting. (P-wave form dipole source in slow formation. Stolt migration).

\* cited by examiner

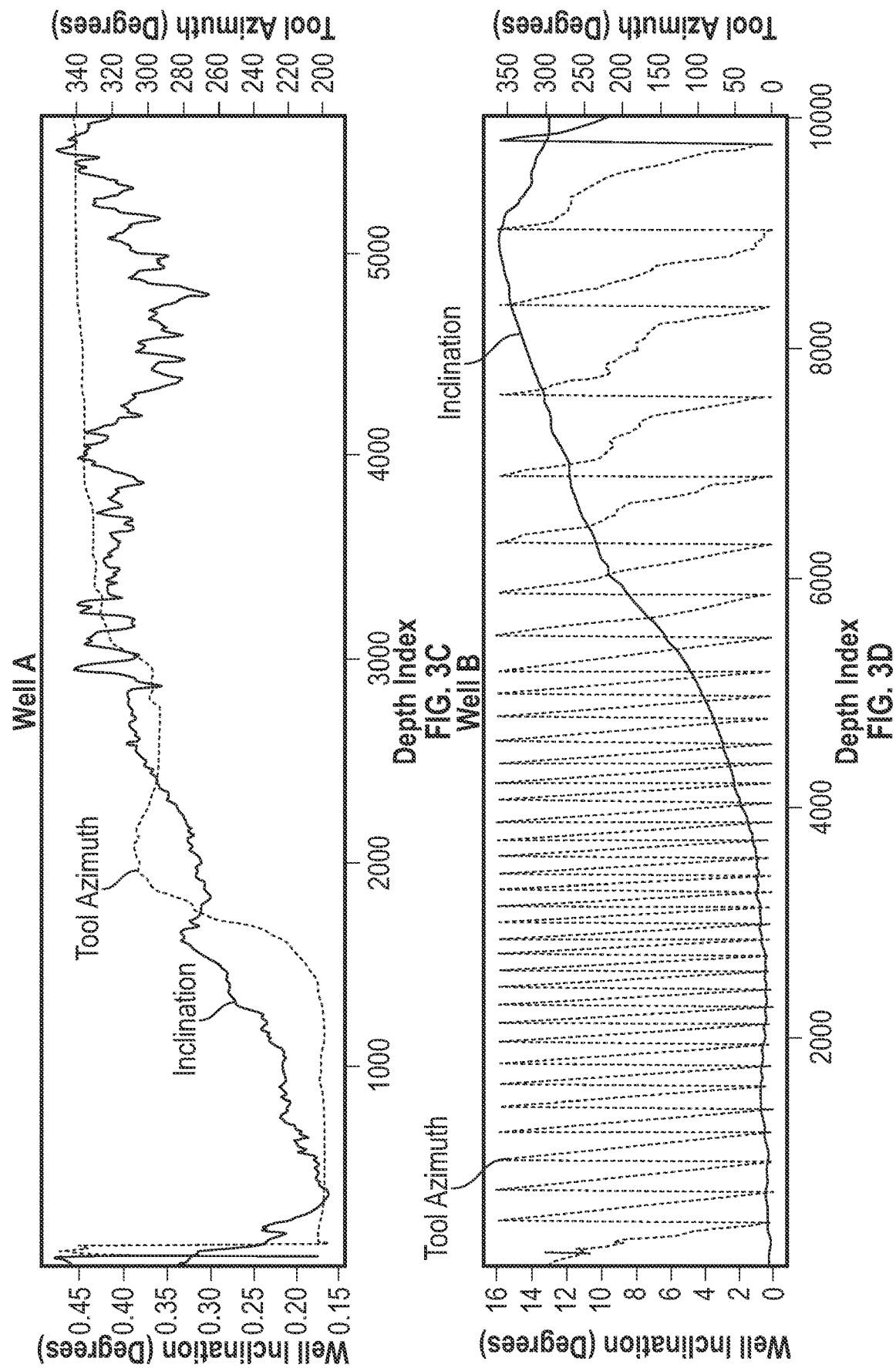

INTERPOLATION METHOD AND SYSTEM TO OBTAIN AZIMUTHAL BOREHOLE SONIC MEASUREMENTS

FIELD OF THE INVENTION

The present invention relates generally to hydrocarbon exploration using acoustic logging and, more specifically, to methods and systems to obtain borehole sonic measurements at constant azimuths for an entire logging run using various interpolation techniques.

BACKGROUND

Some wireline sonic tools in use today do not rotate by controlled means and, those tools which do, often have limited azimuthal receivers. For example, conventional tools often utilize 4 or 8 azimuthal receivers at each level. For those tools using 4 receivers, the azimuthal sampling rate is 90 degrees, and for those using 8 receivers the azimuthal sampling rate is 45 degrees. For example, in order to obtain the azimuth of reflected P-, SV, and SH wave signals, a fine azimuthal resolution (for example, 10 degrees) is required for imaging processing.

Conventional methods for cross-dipole data processing use Alford's rotation method to obtain inline and crossline dipole signals at arbitrary azimuths in the well for horizontal transverse isotropy ("HTI"), shear wave azimuthal anisotropy in a plane perpendicular to the well, or imaging far away from the well bore. However, such methods only rotate the dipole data and not the monopole or higher multipole order such as quadrupole and hexapole. The information contained in these monopole and higher multipole order data can be critical for the final interpretation of the data or the decision on the next processing step to take, for example, whether or not to perform imaging away from the well bore. Missing these components may decrease the accuracy and increase the uncertainty of the final software answer product.

BRIEF DESCRIPTION OF THE DRAWINGS

FIGS. 3C and 3D are graphs illustrating the tool orientation as a function of the depth index.

DESCRIPTION OF ILLUSTRATIVE EMBODIMENTS

Figure 1:
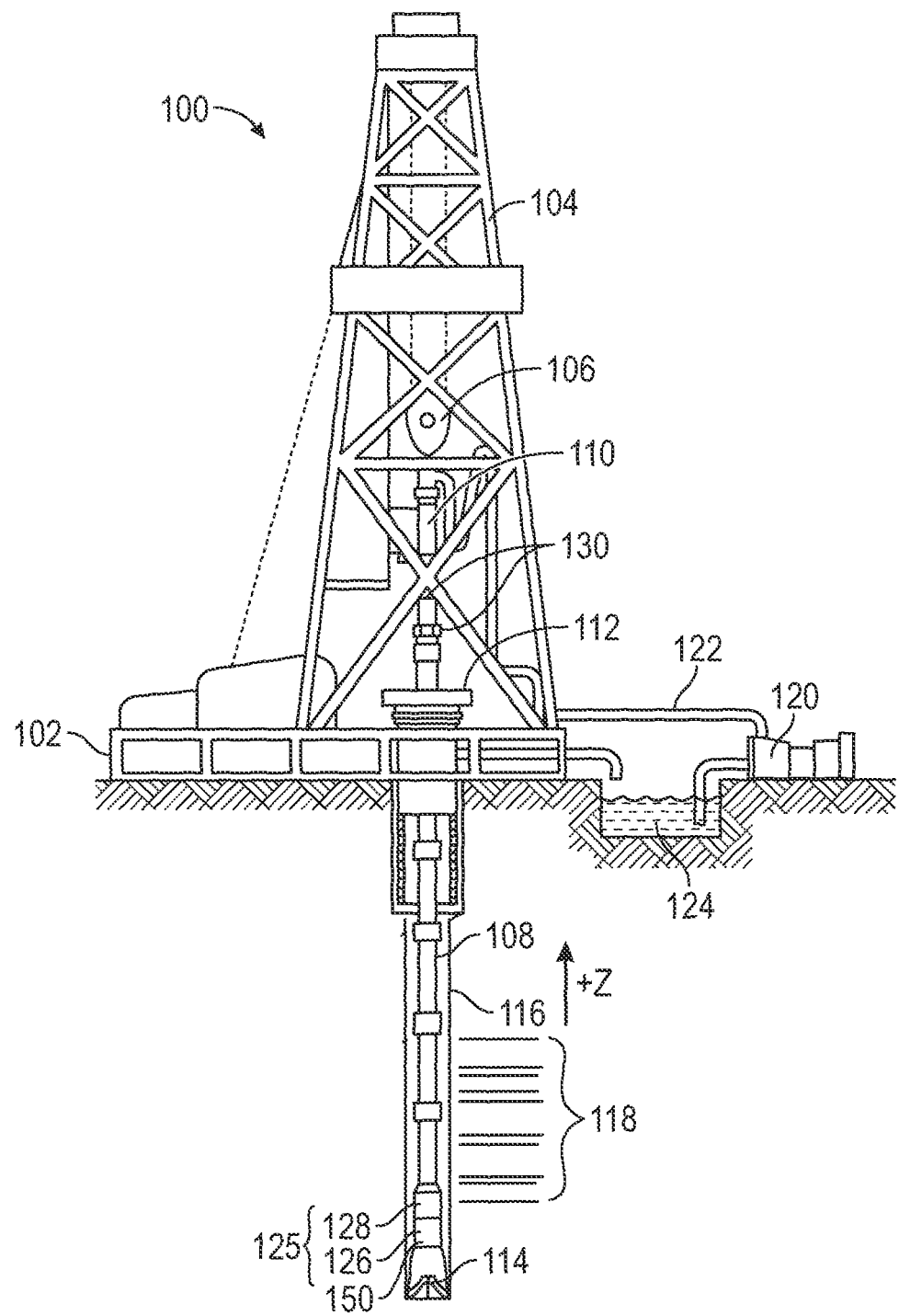
FIG. 1 illustrates an exemplary diagrammatic view of a drilling wellbore operating environment in which the present disclosure may be implemented.

Illustrative embodiments and related methods of the present disclosure are described below as they might be employed to determine one or more characteristics of the hydrocarbon-bearing formation. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Exemplary embodiments of the present invention are directed to systems and methods to determine one or more characteristics of a hydrocarbon-bearing formation. In a generalized method, a logging tool having one or more transmitters and receivers is used to obtain one or more acoustic multicomponent measurements indicative of the parameter of interest. An orientation sensor obtains an orientation measurement of the logging tool. The multicomponent measurements are assigned to a fixed coordinate using the orientation measurement. An interpolation technique is applied to the multicomponent measurements to increase azimuthal coverage and generate interpolated multicomponent measurements at fixed azimuths. The azimuthal coverage of the interpolated multicomponent measurements is higher than the azimuthal coverage of the multicomponent measurements. The interpolated multicomponent measurements are then used to determine one or more characteristics of a hydrocarbon-bearing formation.

Further, the present invention disclosure relates to the processing of data acquired with a downhole acoustic tool having several transmitters (e.g., monopoles and cross-dipoles) and an array of $n_s$ receiver stations each composed of $n_a$ receivers regularly distributed azimuthally in a plane perpendicular to the axis of the tool. Orientation of the tool is also required. At each acquisition depth, the waveforms of each azimuthal receiver of a given receiver station are processed simultaneously through a two-dimensional fast Fourier transform, extrapolation and inverse two-dimensional fast Fourier transform to produce a set of $n_b > n_a$ azimuthal waveforms. At each receiver station, the $n_b$ waveforms are then combined to produce the standard monopole waveforms and the inline and crossline dipole waveforms along $n_b$ fixed azimuths ($=0$ to $(n_b-1)360/n_b$) degrees) over the entire depth range of acquisition. Quadrupole SV waveforms and SH waveforms as well as hexapole waveforms can also be generated. These oriented waveforms produce a finer azimuthal sampling of the surrounding formation. They can then be used for imaging geological features within the surrounding formation as the tool rotation has been countered.

The disclosure now turns to FIG. 1, which illustrates a diagrammatic view of an exemplary logging while drilling (LWD) and/or measurement while drilling (MWD) wellbore operating environment 100 in which the present disclosure may be implemented. As depicted in FIG. 1, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

As depicted in FIG. 1, logging tools 126 are integrated into the bottom-hole assembly 125 near the drill bit 114. As the drill bit 114 extends the wellbore 116 through the formations 118, logging tools 126 collect measurements relating to various formation parameters/properties as well as the orientation of the tool and various other drilling conditions. The bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered.

Each of the logging tools 126 may include a plurality of tool components, spaced apart from each other, and communicatively coupled with one or more wires. Logging tools 126 may include tools such as those further described herein to perform acoustic (e.g., "sonic") logging. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an azimuthal array positioned in a plane perpendicular to the axis of the tool to facilitate capturing and processing acoustic response signals at specific intervals. The acoustic response signals are further analyzed to determine borehole and adjacent formation properties and/or characteristics. The telemetry sub 128 may include wireless telemetry or logging capabilities, or both, such as to transmit or later provide information indicative of received acoustic energy/waveforms to operators on the surface or for later access and data processing for the evaluation of formation 118 properties.

The logging tools 126, including the acoustic logging tool, may also include one or more computing devices 150 communicatively coupled with one or more of the plurality of tool components. The computing device 150 may be configured to control or monitor the performance of the tools 126, process logging data, and/or carry out the illustrative methods of the present disclosure.

In some embodiments, one or more of the logging tools 126 may communicate with a surface receiver 130, such as wired drill pipe. In other cases, the one or more of the logging tools 126 may communicate with a surface receiver 130 by wireless signal transmission. In at least some cases, one or more of the logging tools 126 may receive electrical power from a wire that extends to the surface, including wires extending through a wired drill pipe. In some embodiments, the computing device may be included in surface receiver 130. For example, surface receiver 130 of wellbore operating environment 100 at the surface may include one or more of wireless telemetry, processor circuitry, or memory facilities, such as to support substantially real-time processing of data received from one or more of the logging tools 126. In some embodiments, data are processed at some time subsequent to its collection, wherein the data may be stored on the surface at surface receiver 130, stored downhole in telemetry sub 128, or both, until it is retrieved for processing.

Figure 2:
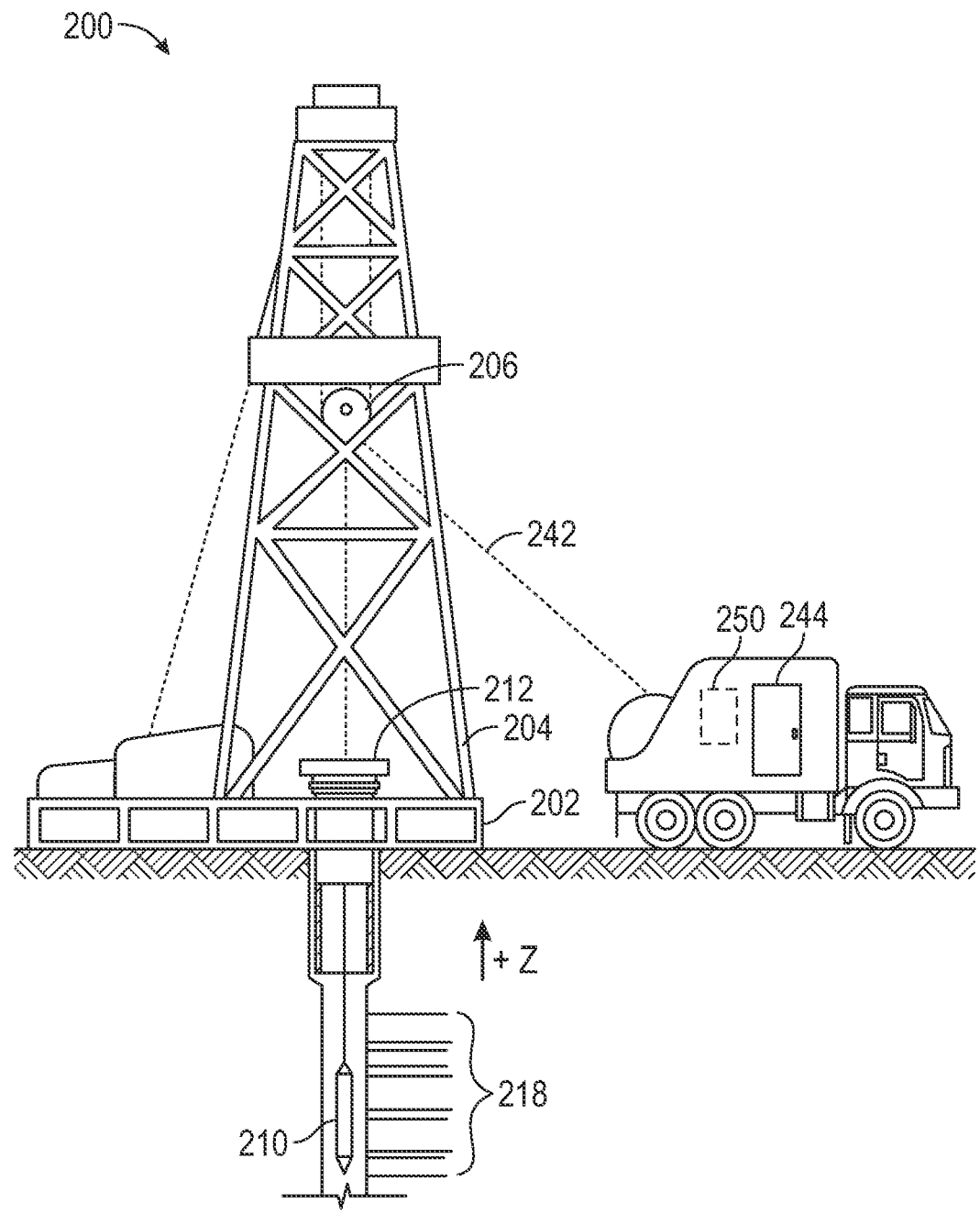
FIG. 2 illustrates an exemplary diagrammatic view of a conveyance logging wellbore operating environment in which the present disclosure may be implemented.

FIG. 2 illustrates a diagrammatic view of a conveyance logging wellbore operating environment 200 (also referred to as "wireline" in the field) in which the present disclosure may be implemented. As depicted in FIG. 2, a hoist 206 may be included as a portion of a platform 202, such as that coupled to derrick 204, and used with a conveyance 242 to raise or lower equipment such as acoustic logging tool 210 into or out of a borehole. Acoustic logging tool 210 may include, for example, tools such as those shown in FIGS. 1-2. A conveyance 242 may provide a communicative coupling between the acoustic logging tool 210 and a logging facility 244 at the surface. The conveyance 242 may include wires (one or more wires), slicklines, cables, or the like, as well as tubular conveyances such as coiled tubing, joint tubing, or other tubulars, and may include a downhole tractor. Additionally, power can be supplied via the conveyance 242 to meet power requirements of the tool. The acoustic logging tool 210 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval.

The logging facility 244 may include a computing device 250 capable of carrying out the methods and techniques of the present disclosure. In this manner, information about the formation 218 may be obtained by acoustic logging tool 210 and processed by a computing device, such as computing device 250. In some embodiments, computing device 250 can be equipped to store the received information for processing at some subsequent time.

The illustrative interpolation methods of the present disclosure may be used in open and cased holes. In order to obtain the orientation data in cased hole applications, a variety of methods may be used such as, for example, the one can used in U.S. Pat. No. 8,489,333 entitled "DEVICE ORIENTATION DETERMINATION", naming Clovis Bonavides and Philip Tracadas as inventors, the disclosure of which is hereby incorporated by reference in its entirety.

Figure 3A:
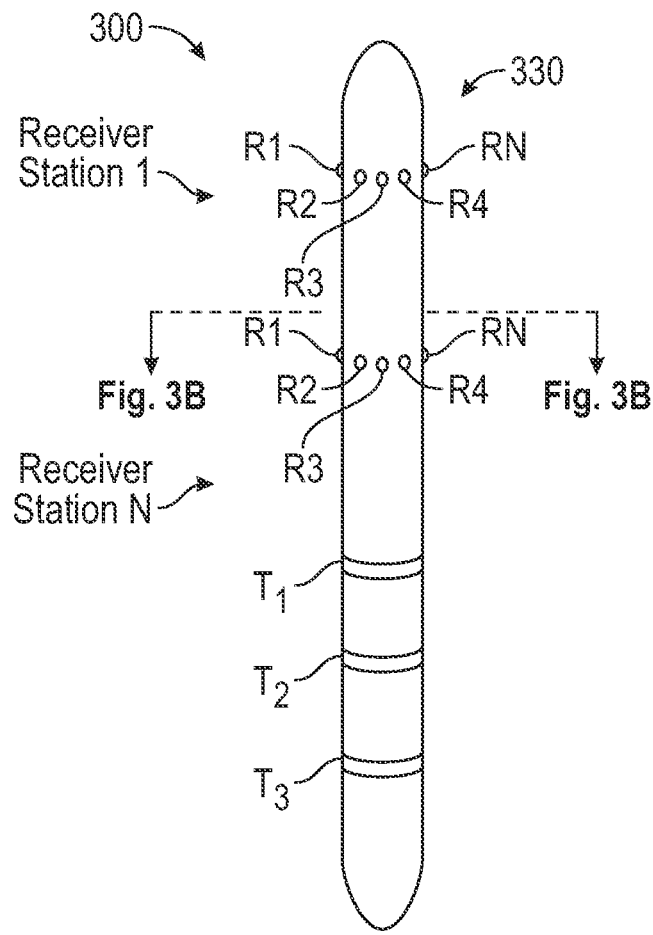
FIG. 3A illustrates a diagrammatic view of an acoustic logging tool capable of performing the presently disclosed methods and techniques in accordance with certain exemplary embodiments of the present disclosure.

FIG. 3A illustrates a diagrammatic view of an acoustic logging tool 300 capable of performing the presently disclosed methods and techniques in accordance with certain exemplary embodiments of the present disclosure. As depicted in FIG. 3A, acoustic logging tool 300 includes one or more transmitters T1-T3 capable of exciting acoustic signals/waves of different azimuthal orders, although additional transmitters may be provided as desired. Acoustic logging tool 300 further includes an azimuthal receiver array 330 comprising a number of receivers, illustrated here as receivers R1-RN, where each set of receivers form a receiver station 1-n. In certain embodiments, the receivers are evenly spaced along logging tool 300, and (although not shown) the receivers are distributed azimuthally in a plane perpendicular to the axis of the tool. As illustrated, receivers R1-RN are evenly spaced, similar to the Xaminer® Sonic Image Tool (XSI), available from Halliburton Energy Services, Inc.

Figure 3B:
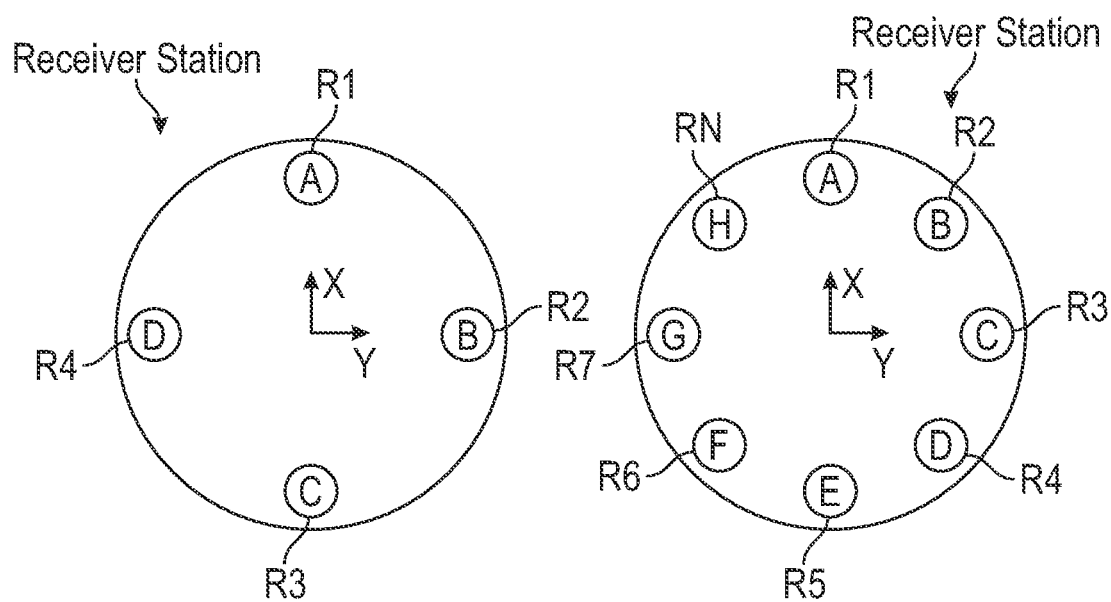
FIG. 3B is a cross sectional view of alternate embodiments of receiver stations 1-N, according to certain illustrative embodiments of the present disclosure.

FIG. 3B is a cross sectional view of alternate embodiments of receiver stations 1-N. As can be seen, each receiver station includes receiver(s) R1-RN evenly spaced azimuthally in the plane perpendicular to the axis of the tool. The receiver station with on the left includes 4 azimuthal receivers, while the receiver station on the right includes 8 azimuthal receivers. X and Y refer to the orientation of the dipole sources.

FIG. 3C is a graph illustrating the tool orientation as a function of the depth index. As shown by the inclination line, the well is vertical. The tool azimuth varies relatively smoothly between 200 and 340 degrees with respect to the magnetic North. In other situations, the rotation can be more severe, as shown in FIG. 3D which is another graph showing the tool orientation as a function of the depth index. In the example shown in the graph, the tool performs 35 full rotations, i.e., from 0 to 360 degrees with respect to magnetic North, at a rate that increases with decreasing well deviation/inclination. It has to be noted that tool rotation rarely occurs when logging sub-horizontal wells (inclination greater than 80 degrees for example). Data acquired in the situation illustrated by FIGS. 3C and 3D cannot be used as is for advanced processing and analysis such as shear wave azimuthal anisotropy and imaging possible features within the surrounding formation.

Figure 3E:
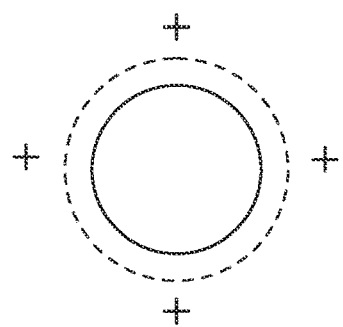
FIG. 3E displays the radiation of monopole source and receiver (isotropic).

Embodiments of the present disclosure may be utilized with a variety of waveform sources. For context, data are qualified as monopole when both the source and the receiver(s) are monopoles. The same rule applies for dipole, quadrupole and hexapole data. Conventional wireline acoustic logging tools generate monopole and dipole data. It is only in the past that a wireline quadrupole tool was considered. On the other hand, conventional LWD tools include quadrupole source and receiver(s). Hexapoles have also been considered (Geerits, T. W., Mandal, B. and Schmitt, D. P., 2012. Acoustic logging while drilling having a hexapole source configuration and associated logging methods. U.S. Pat. No. 8,125,848). For reference, FIG. 3E displays the radiation of monopole source and receiver (isotropic), while FIG. 3F displays the radiation of source and receiver for a dipole (left), quadrupole (middle) and hexapole (right). As indicated by the "+" and "−" signs, a monopole receiver can be obtained by straight summing an even number of individual monopoles. A dipole receiver is obtained by differentiating the monopole located at 180 degrees from one another. A quadrupole receiver is obtained by considering 4 monopoles distributed at 90 degrees from one another with different alternate signs, and a hexapole receiver is obtained by considering 6 monopole receivers distributed at 60 degrees from one another with alternate signs.

Figure 3F:
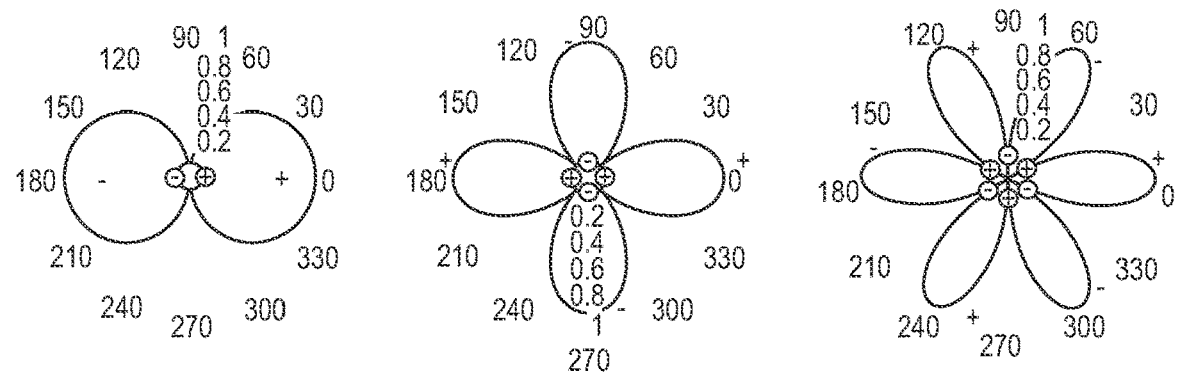
FIG. 3F displays the radiation of source and receiver for a dipole (left), quadrupole (middle) and hexapole (right).
Figure 3G:
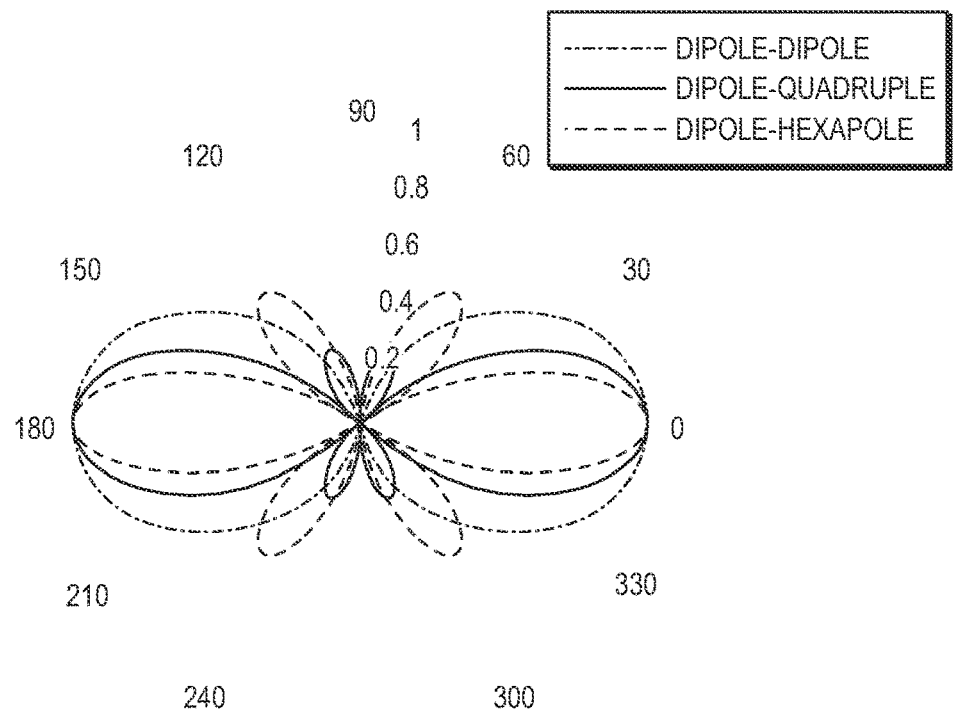
FIG. 3G displays the radiation pattern obtained when a dipole source is combined with a dipole receiver (dipole-dipole line), a quadrupole receiver (dipole-quadrapole line) and a hexapole receiver (dipole-hexapole line).

FIG. 3G displays the radiation pattern obtained when a dipole source is combined with a dipole receiver (dipole-dipole line), a quadrupole receiver (dipole-quadrapole line) and a hexapole receiver (dipole-hexapole line). FIG. 3F illustrates types of sources which can be used in the present disclosure.

To further describe the fundamental principles of the present disclosure, consider a wireline acoustic tool that has several transmitter types distributed along its longitudinal axis: two dipole sources, offset or collocated, oriented 90 degrees to one another in (a) plane(s) perpendicular to the axis of the tool and usually referred to X and Y, and several monopole sources. The tool also includes an array of $n_s$ receiving stations along its longitudinal axis, each receiving station comprising $n_a$ azimuthal receivers distributed regularly in a plane perpendicular to the tool axis. The array of receiving stations can be located either above or below the transmitters. Today's wireline acoustic logging tools usually have $n_s$=8 or 13 receiving stations with $n_a$=4 or 8 azimuthal receivers, respectively (the XAST or XSI tool of Halliburton Energy Services, Inc., for example).

When conveyed in a fluid-filled borehole to infer elastic properties of the surrounding formations, the transmitters are fired sequentially, and the emitted signals, after propagation in the surrounding media, are recorded over a given listening time at each azimuthal receiver of each receiving station. The monopole sources are fired with a high frequency pulse to bolster the generation of the compressional and shear body waves and with a low frequency pulse to bolster the generation of the Stoneley interface wave. The time sampling rate is different for each firing as well as the listening time, i.e., the number of time samples. The firings and recordings are repeated over the length of the zone of interest at regular intervals. At the end of a run, the available data at $n_z$ depths are then:

$$\begin{cases} mp(i_z, i_s, i_a, i_t), & i_z = 1 \text{ to } n_z, \ i_s = 1 \text{ to } n_s, \ i_a = 1 \text{ to } n_a, \ i_t = 1 \text{ to } n_p, \\ st(i_z, i_s, i_a, i_t), & i_z = 1 \text{ to } n_z, \ i_s = 1 \text{ to } n_s, \ i_a = 1 \text{ to } n_a, \ i_t = 1 \text{ to } n_{st}, \\ x(i_z, i_s, i_a, i_t), & i_z = 1 \text{ to } n_z, \ i_s = 1 \text{ to } n_s, \ i_a = 1 \text{ to } n_a, \ i_t = 1 \text{ to } n_d, \\ y(i_z, i_s, i_a, i_t), & i_z = 1 \text{ to } n_z, \ i_s = 1 \text{ to } n_s, \ i_a = 1 \text{ to } n_a, \ i_t = 1 \text{ to } n_d, \end{cases}$$

where, mp( . . . ) denotes data recorded with $n_p$ time samples after a monopole transmitter firing at high frequencies, st( . . . ) denotes data recorded with $n_{st}$ time samples after a monopole transmitter firing at low frequencies, x( . . . ) denotes data recorded with $n_d$ samples after a X-dipole firing, y( . . . ) denotes data recorded with $n_d$ samples after a Y-dipole firing.

The common depth of measurement is usually arbitrarily set to the depth location of the middle of the array of receiving s(?ons. The acoustic tool orientation, ($i_z$) is also recorded during the acquisition at each depth, usually aligned with one of the dipole transmitters. It does correspond to the azimuth with respect to magnetic North if the borehole inclination is less than 30 degrees, or to the relative bearing with respect to the top of hole otherwise.

The data used in the subsequent processing workflows are the so-called composed (or decomposed) ones:

$$\begin{cases} wmp(i_z, i_s, i_t) = \sum_{i_a=1}^{n_a} mp(i_z, i_s, i_a, i_t) \\ wst(i_z, i_s, i_t) = \sum_{i_a=1}^{n_a} st(i_z, i_s, i_a, i_t) \\ xx(i_z, i_s, i_t) = \sum_{i_a=1}^{n_a} x(i_z, i_s, i_a, i_t)\cos(\theta_{i_a} + \theta_X) \\ xy(i_z, i_s, i_t) = \sum_{i_a=1}^{n_a} x(i_z, i_s, i_a, i_t)\sin(\theta_{i_a} + \theta_X) \\ yx(i_z, i_s, i_t) = \sum_{i_a=1}^{n_a} y(i_z, i_s, i_a, i_t)\cos(\theta_{i_a} + \theta_Y) \\ yy(i_z, i_s, i_t) = \sum_{i_a=1}^{n_a} y(i_z, i_s, i_a, i_t)\sin(\theta_{i_a} + \theta_Y) \end{cases}$$

where xx( . . . ) and yy( . . . ) are referred to as the inline dipoles data, while xy( . . . ) and yx( . . . ) are referred to as the crossline dipoles data. The convention is that the first letter refers to the transmitter, while the second one refers to the receiver. $\theta_X$ and $\theta_Y$ are the angular position of the dipole sources. As mentioned earlier, one of the dipole sources is chosen as an angular reference. Without losing any generality, the X-dipole can be used as a reference and the angles assumed to be positive clockwise.

Then $\theta_X = \sigma(i_z)$ degrees and $\theta_Y = \sigma(i_z)+90$ degrees. The above data can also be generated downhole. Last, it is important to note that these composed waveforms will have different orientations at different depths if the tool has rotated during the acquisition.

Quadrupole and hexapole at the receiver station levels can be generated by taking the cosine and sine of twice and three times the angles, respectively, in the equations above. Often, and especially in small boreholes (e.g., $5^{7/8}$ inches in diameter), the tool rotates around its axis during the acquisition. This impairs the use of the data for imaging potential reflectors within the formation, especially when the rotation(s) is (are) more than a few degrees. The events imaged through single well imaging are reflectors/discontinuities that exhibit an impedance contrast large enough compared to the background. A reflector/discontinuity can be a fault, a fracture, a lithological boundary or a fluid contact, for example. Such features do not need to intersect the well bore. Last, only features not sub-perpendicular to the well bore can be imaged away from the well bore.

Conventional approaches only use composed data rotated using the so-called Alford rotation used routinely in the shear wave azimuthal anisotropy processing. The present disclosure, however, uses na original azimuthal receivers of each receiving stations to produce over the entire depth range of acquisition an ensemble of $n_b > n_a$ datasets of composed waveforms, each having a constant orientation. Such datasets can then be used for imaging purpose.

Illustrative embodiments of the present disclosure assume the azimuthal receivers at each receiver station are properly matched and do not "misbehave" during the acquisition. Instead of rotating the data with Alford's method as in conventional methods, the present disclosure provides processing with a 2D interpolation method implemented using 2D Fast Fourier Transforms with zero paddings. The following processing steps can be applied on frequency filtered raw data or data on which several processing operations have been performed. First, the case of dipole data and then that of monopole data will be discussed.

In certain embodiments, the processing relevant to the present disclosure is performed for each time sample of the collection of the azimuthal receivers of a given receiver station at a given depth, i.e., $i_z$, $i_s$, and $i_t$ must be considered as constant. The entire dataset for the depth acquisition range is obtained by repeating the operation for each $i_t$ time sample of the collection of all azimuthal receivers of each $i_s$ receiving station at each $i_z$ acquisition depth.

In the following illustrative method, without loosing any generality, the angles are positive clockwise, and the X-dipole and Y-dipole are assumed to refer to a left-handed coordinate system. In addition, the following nomenclature is to be used:

$\hat{i}$: imaginary complex number ($\hat{i}^2 = -1$)
$i_a$: index of azimuthal receiver of the tool
$i_s$: index of receiving station
$i_t$: index of time sample of a waveform
$i_z$: index of depth acquisition
$n_a$: number of azimuthal receivers at each receiving station
$n_b$: number of calculated azimuthal waveforms (=32 in certain embodiments)
$n_d$: number of time samples in a dipole waveform
$n_p$: number of time samples in a monopole waveform
$n_s$: number of receiving stations along the tool axis
$n_{st}$: number of time samples in a Stoneley waveform
$\sigma()$: tool orientation (depth dependent)
mp( . . . ): recorded data at a given azimuthal receiver generated by a high frequency monopole source.
st( . . . ): recorded data at a given azimuthal receiver generated by a low frequency monopole source.)
x( . . . ): recorded data at a given azimuthal receiver generated by the X dipole source.)
y( . . . ): recorded data at a given azimuthal receiver generated by the Y dipole source.
wmp( . . . ): composed data related to a high frequency monopole source firing.
wst( . . . ): composed data related to a low frequency monopole source firing.
xx( . . . ): inline composed data related to the X-dipole firing and recorded along the X direction.
xy( . . . ): crossline composed data related to the X-dipole firing and recorded along the Y direction.
yx( . . . ): crossline composed data related to the Y-dipole firing and recorded along the X direction.
yy( . . . ): inline composed data related to the Y-dipole firing and recorded along the Y direction.
$\widetilde{xx}$( . . . ): inline composed data after processing related to the X-dipole firing)
$\widetilde{xy}$( . . . ): crossline composed data after processing related to the X-dipole firing
$\widetilde{yx}$( . . . ): crossline composed data after processing related to the Y-dipole firing
$\widetilde{yy}$( . . . ): inline composed data after processing related to the Y-dipole firing
$\widetilde{qpsv}$( . . . ): quadrupole (SV) data after processing related to dipole firing
$\widetilde{qpsh}$( . . . ): quadrupole (SH) data after processing related to dipole firing
$\widetilde{hp}$( . . . ): hexapole data after processing related to dipole firing
$I_{K_R}$: wavenumber index along the receiving side
$I_{K_T}$: wavenumber index along the transmitting side
A: real matrix whose elements come from actual recorded data after dipoles firing
Ã: real matrix whose elements come from processed dipole data
$F_?$: complex matrices used during monopole data processing
P: real matrix whose elements come from actual recorded data after monopole firing
P̃: real matrix whose elements come from processed monopole data
$T_?$: complex matrices used during dipole data processing
$\theta_{i_a}$: angular relative position of an azimuthal receiver.
$\theta_X$: angular relative position of the X-dipole
$\theta_Y$: angular relative position of the Y-dipole With the foregoing nomenclature in mind, this first illustrative method to be described is the processing of dipole data. In step one, for a given $i_s$ receiving station at a given $i_z$ depth, a time sample $i_t$ of all the azimuthal receivers is first collected in order to build the $4 \times n_a$ real matrix A in the space-time domain as:

$$A = \begin{pmatrix} x(i_z, i_s, 1, i_t) & x(i_z, i_s, 2, i_t) & \cdots & x(i_z, i_s, n_a, i_t) \\ y(i_z, i_s, 1, i_t) & y(i_z, i_s, 2, i_t) & \cdots & y(i_z, i_s, n_a, i_t) \\ -x(i_z, i_s, 1, i_t) & -x(i_z, i_s, 2, i_t) & \cdots & -x(i_z, i_s, n_a, i_t) \\ -y(i_z, i_s, 1, i_t) & -y(i_z, i_s, 2, i_t) & \cdots & -y(i_z, i_s, n_a, i_t) \end{pmatrix}$$

In step two, a two-dimensional Fast Fourier transform of the real matrix A in the wavenumber-wavenumber domain is performed to obtain a $T_1$ complex $4 \times n_a$ matrix as reflected below:

$$T_1(I_{K_T}, I_{K_R}) = 2dFFT(A)$$

where $I_{K_T}$ is the wavenumber index at the transmitting side, and $I_{K_R}$ is the wavenumber index at the receiving side (i.e., two dimensional). The first half of the wavenumber index, i.e., 1 to 3 for $I_{K_T}$ and 1 to $$\left(\frac{n_a}{2}+1\right)$$

for $I_{K_R}$, denotes the positive wavenumber axis, while the second half of the wavenumber index, i.e., 4 for $I_{KT}$ and $$\left(\frac{n_a}{2}+2\right)$$

to $n_a$ for $I_{K_R}$, represents the negative wavenumber axis. For a real signal in the spatial domain, the spectra with negative wavenumbers are the conjugate symmetric of those with positive wavenumbers.

In step three, a phase shift related to the actual orientation ($e^{i\sigma}(i_z)$) of the dataset is then performed:

$$\begin{cases} T_1'(I_{K_T}, I_{K_R}) = T_1(I_{K_T}, I_{K_R})e^{-i\sigma(i_z)(I_{K_T}-1)}, & \text{for } I_{K_T} = 1 \text{ to } 3 \text{ and } I_{K_R} = 1 \text{ to } n_a \\ T_1'(4, I_{K_R}) = T_1(4, I_{K_R})e^{+i\sigma(i_z)}, & \text{for } I_{K_R} = 1 \text{ to } n_a \\ T_2(I_{K_T}, I_{K_R}) = T_1'(I_{K_T}, I_{K_R})e^{-i\sigma(i_z)(I_{K_T}-1)}, & \text{for } I_{K_T} = 1 \text{ to } 4 \text{ and } I_{K_R} = 1 \text{ to } \frac{n_a}{2}+1 \\ T_2(I_{K_T}, I_{K_R}) = T_1'(I_{K_T}, I_{K_R})e^{+i\sigma(i_z)(n_a-I_{K_R}+1)}, & \text{for } I_{K_T} = 1 \text{ to } 4 \text{ and } I_{K_R} = \frac{n_a}{2}+2 \text{ to } n_a \end{cases}$$

where $\hat{i}^Z=-1$, and e is the exponential function. This phase shift operation aligns the data with the azimuth or relative bearing of zero degrees.

In step four, the data is interpolated (i.e., determining unknown values that fall between the known values) in the wavenumber domain. First, the interpolated data is initialized to zeros, also referred to as zero padding. Zero padding occurs when a border of data is added (all with value zero) around the edges of the original data in time, frequency or wavenumber domain. This adds a padding of zeros around the outside of the original data, hence the name zero padding. This implies the number of interpolated orientations ($n_p$) is chosen. For certain embodiments, $n_p$ is equal to 32. The interpolated azimuthal data will then be distributed every 11.25 degrees.

$$T_3(I_{K_T}, I_{K_R}) = \begin{pmatrix} 0 & \cdots & 0 \\ \vdots & \ddots & \vdots \\ 0 & \cdots & 0 \end{pmatrix}$$

where $T_3(I_{K_T}, I_{K_R})$ is a 32×32 complex matrix whose elements are given by:

$$\begin{cases} T_3(I_{K_T}, I_{K_R}) = T_2(I_{K_T}, I_{K_R}), & \text{for } I_{K_T} = 1 \text{ to } 3, \text{ and } I_{K_R} = 1 \text{ to } \frac{n_a}{2}+1 \\ T_3(I_{K_T}, I_{K_M}) = T_2(I_{K_T}, I_{K_R}), & \text{for } I_{K_T} = 1 \text{ to } 3, I_{K_M} = 32-\frac{n_a}{2}+2 \text{ to } 32, \text{ and } I_{K_R} = \frac{n_a}{2}+2 \text{ to } n_a \\ T_3(32, I_{K_R}) = T_2(4, I_{K_R}), & \text{for } I_{K_R} = 1 \text{ to } \frac{n_a}{2}+1 \\ T_3(32, I_{K_M}) = T_2(4, I_{K_R}), & \text{for } I_{K_M} = 32-\frac{n_a}{2}+2 \text{ to } 32, \text{ and } I_{K_R} = \frac{n_a}{2}+2 \text{ to } n_a \end{cases}$$

where $I_{K_M}$ is the wavenumber index at the interpolated receiving side.

In step five, an inverse two-dimensional Fast Fourier Transform performed in order to generate a real matrix:

$$\tilde{A} = \text{Real}[2dFFT^{-1}(T_3(I_{K_T}, I_{K_R}))]$$

$\tilde{A}$ is a 32×32 real matrix.

In step six, the individual azimuthal waveforms are stored in memory and/or compose the following composed waveforms that will be oriented at an azimuths or relative bearings of $a(m)=a_0+11.25$ (m−1), m=1 to 32, where $a_0$ denotes the reference orientation. In the following equations, mod refers to the function modulo.

Inline X-dipole $\widetilde{xx}$:

$$\widetilde{xx}(i_z, i_s, m, i_t) = \begin{cases} \tilde{A}(m, m) - \tilde{A}(m, m+16), & 1 \leq m \leq 16 \\ \tilde{A}(m, m) - \tilde{A}(m, m-16), & 16 < m \leq 32 \end{cases}$$

Crossline X-dipole $\widetilde{xy}$:

$$\widetilde{xy}(i_z, i_s, m, i_t) = \tilde{A}(m, m_1) - \tilde{A}(m, m_2), \begin{cases} m = 1 \text{ to } 32, \\ m_1 = \mod(m+8-1, 32)+1, \\ m_2 = \mod(m+24-1, 32)+1, \end{cases}$$

Crossline Y-dipole $\widetilde{yx}$:

$$\widetilde{yx}(i_z, i_s, m, i_t) = \tilde{A}(m_1, m) - \tilde{A}(m_1, m_2), \begin{cases} m = 1 \text{ to } 32, \\ m_1 = \mod(m+8-1, 32)+1, \\ m_2 = \mod(m+16-1, 32)+1, \end{cases}$$

Inline Y-dipole $\widetilde{yy}$:

$$\widetilde{yy}(i_z, i_s, m, i_t) = \tilde{A}(m_1, m_1) - \tilde{A}(m_1, m_2), \begin{cases} m = 1 \text{ to } 32, \\ m_1 = \mod(m+8-1, 32)+1, \\ m_2 = \mod(m+24-1, 32)+1, \end{cases}$$

Quadrupole SH $\widetilde{qpsh}$:

$$\widetilde{qpsh}(i_z, i_s, m, i_t)\tilde{A}(m, m_1) - \tilde{A}(m, m_2) + \tilde{A}(m, m_3) - \tilde{A}(m, m_4),$$

$$\begin{cases} m = 1 \text{ to } 32, \\ m_1 = \mod(m + 4 - 1, 32) + 1, \\ m_2 = \mod(m + 12 - 1, 32) + 1, \\ m_3 = \mod(m + 20 - 1, 32) + 1, \\ m_4 = \mod(m + 28 - 1, 32) + 1, \end{cases}$$

Quadrupole SV, referred to as $\widetilde{qpsv}$:

$$\widetilde{qpsv}(i_z, i_s, m, i_t)\tilde{A}(m, m_1) - \tilde{A}(m, m_2) + \tilde{A}(m, m_3) - \tilde{A}(m, m_4),$$

$$\begin{cases} m = 1 \text{ to } 32, \\ m_1 = \mod(m + 32 - 1, 32) + 1, \\ m_2 = \mod(m + 8 - 1, 32) + 1, \\ m_3 = \mod(m + 16 - 1, 32) + 1, \\ m_4 = \mod(m + 24 - 1, 32) + 1, \end{cases}$$

Hexapole, referred to as $\widetilde{hp}$:

$$\widetilde{hp}(i_z, i_s, m, i_t) = \sum_{m_1=1}^{32} \tilde{A}(m, m_1)\cos\left((m_1 - 1)\frac{\pi}{16}\right)$$

In step seven, the results of step six are saved and steps one to six are repeated for each sample time $i_t$. Then, at step eight, steps one to seven are repeated for each $i_s$ receiving station at depth $i_z$. Then, at step nine, steps one to eight are repeated for each depth $i_z$. This concludes the description of the dipole data processing method.

In yet other illustrative methods, monopole data may also be processed. Here, the azimuthal monopole data can be re-oriented making the re-composed data suitable for imaging. This illustrative method is similar to that of the dipole data described above, although now only the wavenumber at the receiving side is considered (i.e., one dimensional).

At step one, for a given $i_s$ receiving station at a given $i_z$ depth, we first collect a time sample $i_t$ of all the azimuthal receivers to build the $1 \times n_a$ real matrix P as:

$$P = (mp(i_z,i_s,1,i_t) mp(i_z,i_s,2,i_t) \ldots mp(i_z,i_s,n_a,i_t))$$

At step two, a one-dimensional Fast Fourier Transform is performed:

$$F_1(1,I_{K_R}) = FFT(P)$$

where $F_1$ is a $1 \times n_a$ complex vector:

Note here it is assumed the spectra with positive wavenumbers are saved in $F_1$ with the index from 1 to $$\frac{n_a}{2} + 1,$$

while the spectra with negative wavenumbers are saved in $F_1$ with the index from $$\frac{n_a}{2} + 2$$

to $n_a$.

In step three, a phase shift related to the actual orientation ($\sigma(i_z)$) is then performed, as previously described:

$$\begin{cases} F_2(1, I_{K_R}) = F_1(1, I_{K_R})e^{-i\sigma(i_z)(I_{K_R}-1)}, \text{ for } I_{K_R} = 1 \text{ to } \frac{n_a}{2} + 1, \\ F_2(1, I_{K_M}) = F_1(1, I_{K_R})e^{+i\sigma(i_z)(n_a-I_{K_R}+1)}, \text{ for } I_{K_R} = \frac{n_a}{2} + 2 \text{ to } n_a, \end{cases}$$

In step four, the data is interpolated in the wavenumber domain. First, the interpolated data is initialized to zeros. Like for the dipole, $n_b$ is chosen equal to 32.

$$P_3(1,I_{K_R}) = (0 \; 0 \; \ldots \; 0)$$

where $F_3(1, I_{K_R})$ is a $1 \times 32$ complex matrix whose elements are given by:

$$\begin{cases} F_3(1, I_{K_R}) = F_2(1, I_{K_R}), \text{ for } I_{K_R} = 1 \text{ to } \frac{n_a}{2} + 1 \\ F_3(1, I_{K_M}) = F_2(1, I_{K_R}), \text{ for } I_{K_M} = 32 - \frac{n_a}{2} + 2 \text{ to } 32, \text{ and } I_{K_R} = \frac{n_a}{2} + 2 \text{ to } n_a \end{cases}$$

Note in some illustrative methods steps three and four can be combined.

In step five, an inverse one-dimensional Fast Fourier Transform is performed:

$$\tilde{P} = \text{Real}[FFT^{-1}(F_3(1,I_{K_R}))]$$

Where $\tilde{P}$ is a $1 \times 32$ real matrix.

At step six, the individual azimuthal waveforms are saved and/or the following composed waveforms are composed that will be oriented at an azimuths or relative bearings of $a(m) = a_0 + 11.25(m-1)$, $m = 1$ to 32, where $a_0$ denotes the reference orientation, as follows:

$$\widetilde{wmp}(i_z,i_s,m,i_t) = \tilde{P}(1,m), 1 \leq m \leq 32$$

At step seven, the results obtained at step six are saved and steps one to six are then repeated for each time sample $i_t$. At step eight, the steps one to seven are repeated for each $i_s$ receiving station at depth $i_z$. Finally, at step nine, the steps one to eight are repeated for each depth $i_z$.

Figure 4:
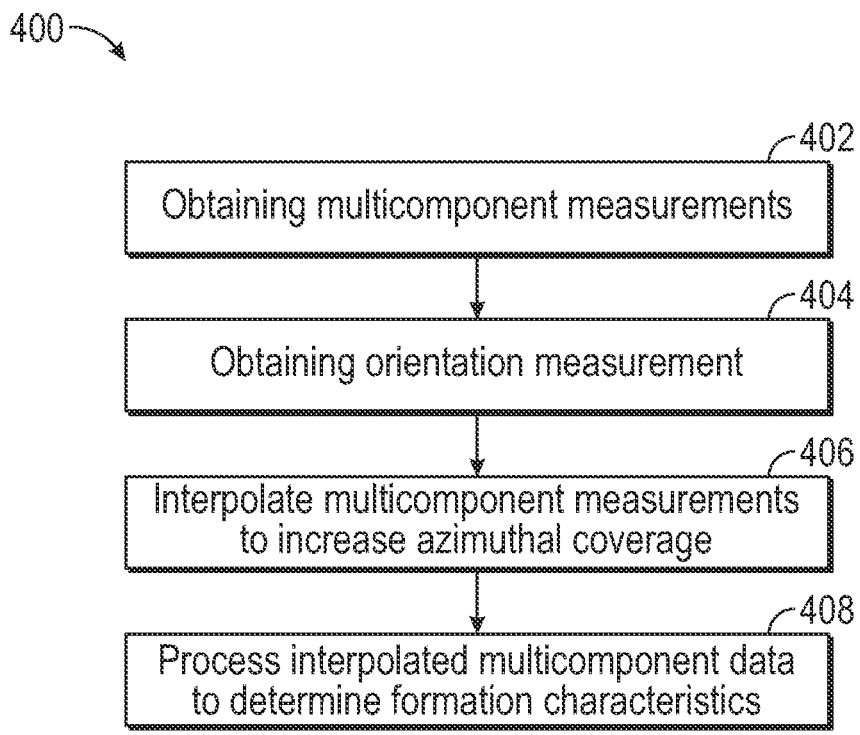
FIG. 4 is a flow chart of a method to determine characteristics of a hydrocarbon bearing formation, according to certain illustrative methods of the present disclosure.

FIG. 4 is a flow chart of a method to determine one or more characteristics of a hydrocarbon-bearing formation, according to certain illustrative methods of the present disclosure. At block 402 of method 400, an acoustic logging tool having transmitters and receivers is positioned along a borehole extending through a formation. The logging tool obtains one or more acoustic multicomponent measurements indicative of the parameter of interest. In this example, azimuthal transmitters are fired sequentially, and the measurement signals are recorded by the azimuthal receivers. An orientation sensor is then used to obtain the orientation of the logging tool at block 404. The obtained data may then go through some processing such as, for example, frequency filtering. A matrix with all the firing and receiving signals (multicomponent measurements) is constructed.

At block 406, the multicomponent measurements are interpolated to obtain data at several fixed azimuths at each acquired depth, thus increasing azimuthal coverage as described herein. In one example, the multicomponent measurements are assigned to a fixed azimuthal coordinate using the orientation measurements. A 2D FFT is applied to the matrix, along with a phase shift and zero padding, and a 2D inverse FFT in order to interpolate the data such that data is acquired at more azimuthal points (thus increasing the azimuthal coverage of the data and thus improving the accuracy of the ultimate image). At block 408, the system then further processes the interpolated multicomponent data in order to determine one or more characteristics of the formation. For example, the data can be decomposed for advanced answer products such as, for example, azimuthal shear slowness processing or far-field imaging along one or several of the fixed azimuthal data points obtained.

Figure 5:
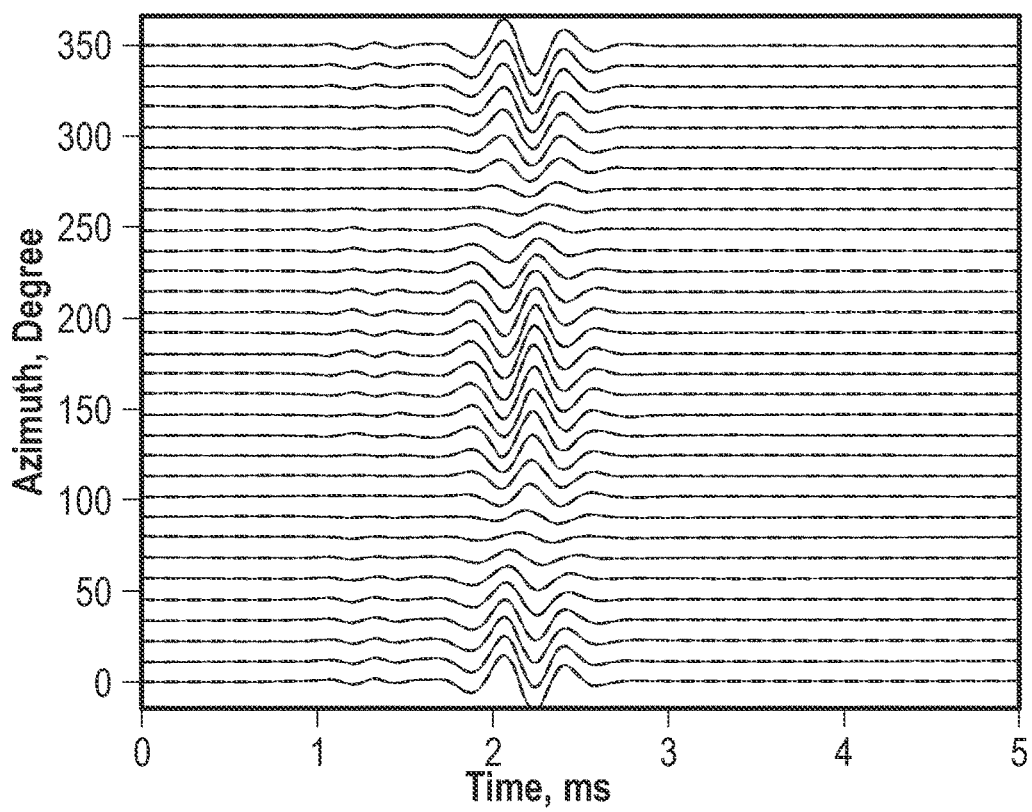
FIGS. 5 and 6 illustrate waveforms obtained using methods of the present disclosure.
Figure 6:
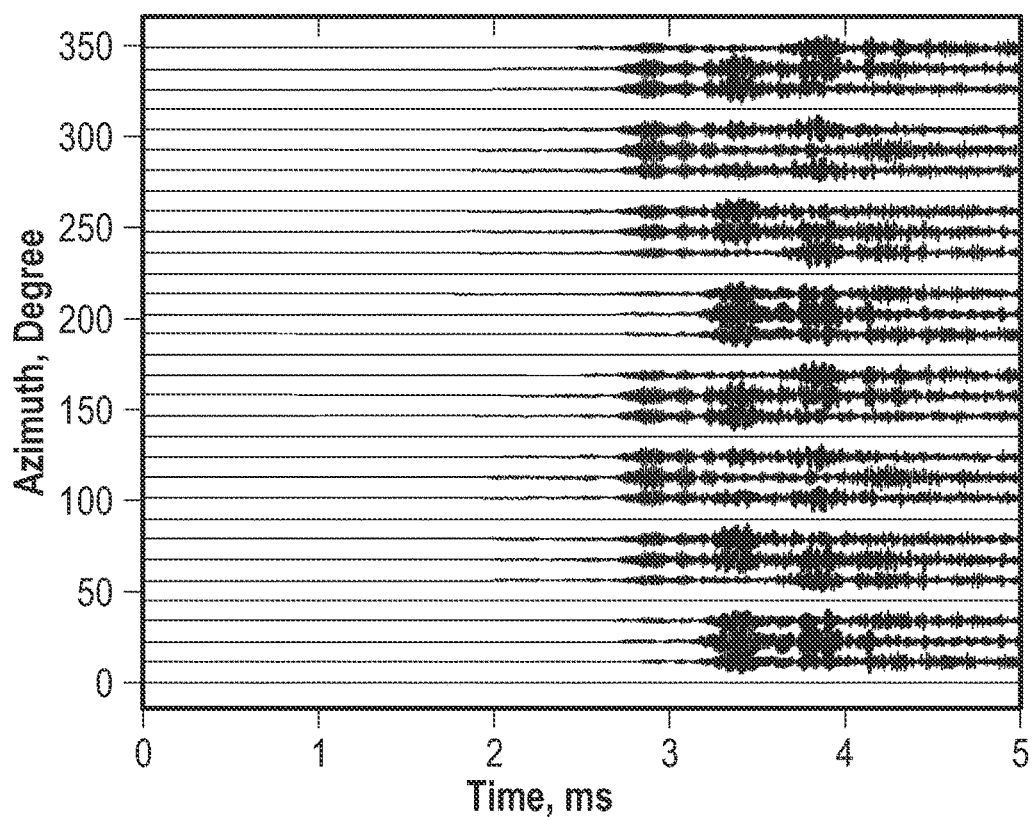

FIGS. 5 and 6 illustrate waveforms obtained using methods of the present disclosure. Consider a fluid filled borehole surrounded by an elastic formation with a dipole source located at 22.5 degrees. Synthetic waveforms generated by dipole sources recorded by dipole receivers can be calculated using finite difference simulation. FIG. 5 displays the waveforms (time series) obtained with a dipole source oriented at 22.5 degrees and 32 dipole receivers oriented from 0 to 348.75 degrees for a given source to receiver distance (solid lines). The dotted lines are the reconstructed signals using the waveforms generated (using the interpolation methods described herein) with cross dipole sources (X and Y sources located at 0 and 90 degrees) and eight azimuthal monopole receivers located every 45 degrees using the interpolation method. FIG. 6 displays the difference between the two calculations multiplied by 1000, which further illustrates the reliability of the interpolation method.

Figure 7:
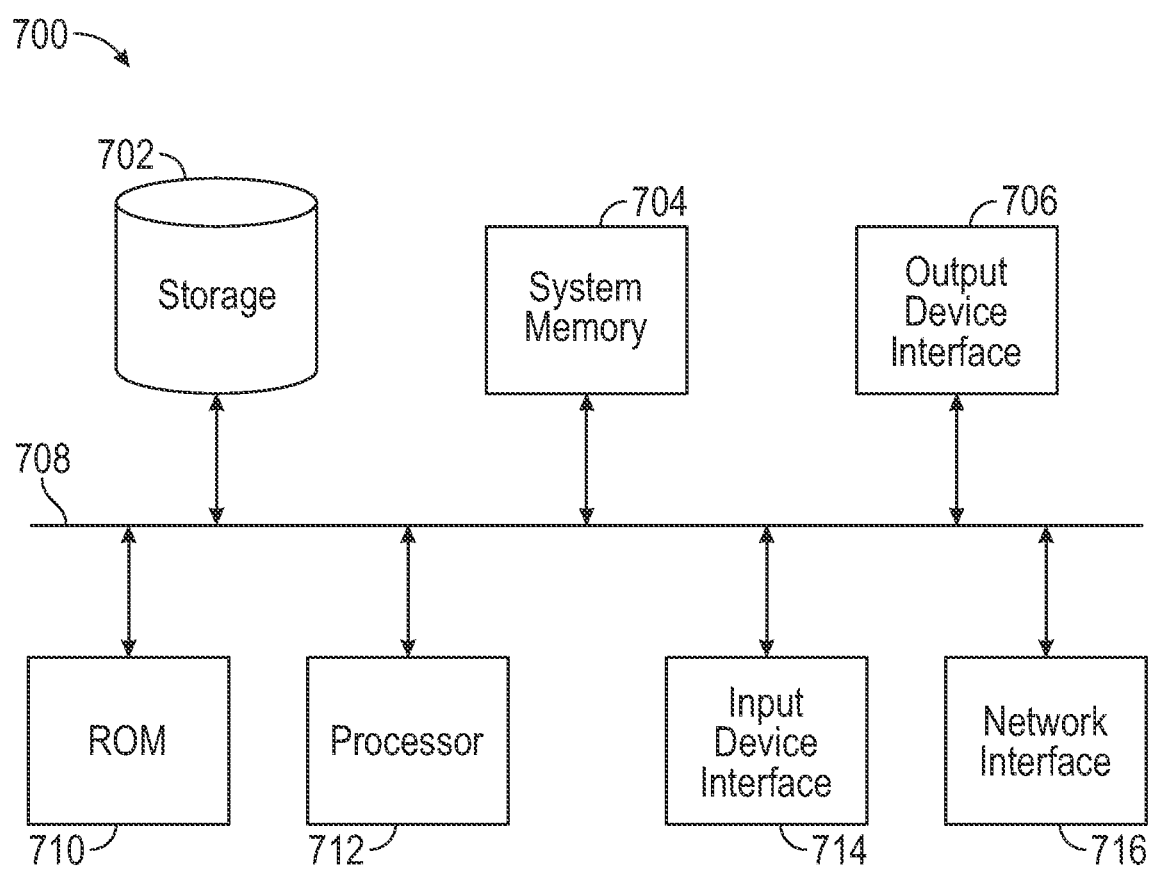
FIG. 7 is a block diagram of an exemplary computer system 600 in which embodiments of the present disclosure may be implemented.

FIG. 7 is a block diagram of an exemplary computer system 700 in which embodiments of the present disclosure may be implemented. System 700 can be a computer, phone, PDA, or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 508 communicatively connects processing unit(s) 712 with ROM 710, system memory 504, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for computer aided pipe string design based on existing string designs in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the system 700. Input devices used with input device interface 714 include, for example, alphanumeric, QWERTY, or T9 keyboards, microphones, and pointing devices (also called "cursor control devices"). Output device interfaces 706 enables, for example, the display of images generated by the system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network ("LAN"), such as an Intranet, or a wide area network ("WAN"), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes described above may be implemented using system 500 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The illustrative methods proposed herein enables the use of data at various azimuth without performing dipole rotation per se. The generation of data at constant azimuths over the length of a logging run has numerous other advantages. For example, monopole data, due to isotropic radiation at the source and receiver level cannot be used for borehole imaging, when the tool rotates. The interest of having data at constant azimuths is supported by Jervis et al. (Jervis, M., Bakulin, A., Tonellot, T. L., Ghamdi, I., Shabbir A., Yamamoto, H. 2012, *High resolution seismic imaging from a single borehole to detect a nearby well*, presented at the SEG Intl. Meeting). Jervis et al. used the data generated in a horizontal well by a monopole source and recorded at few of the 8 azimuthal receivers of each receiving station to locate a nearby vertical well. The success of the processing was based on the fact that the tool did not rotate. The present interpolation method enables such operation with even more accuracy due to the generation of more azimuthal data.

Another issue with imaging performed with acoustic data is the determination of the dip and azimuth of the reflectors within the formation surrounding the well bore. For example, Tang and Patterson (Tang., X. M. and Patterson, D. J. 2009. Single-well S-wave imaging using multicomponent dipole acoustic log data. Geophysics, 74 (6). WCA211-WCA223.) focused on the use of SH versus SV reflections, while Hirabayashi (Hirabayashi N., 2016. *Reflector imaging using trial reflector and cross-correlation: application to fracture imaging for sonic data*, Geophysics, vol. 81, 6, S433-S446) presented migrations algorithms that encompassed is the estimation of the dip of the reflectors using ray tracing. Hirabayashi et al. (Hirabayashi N., Sakiyama N. and Ikegami T., 2017, *Characteristics of waveforms recorded by azimuthally spaced hydrophones of sonic logging tool for incident plane waves*, Geophysics, vol. 82, 6, D353-D368) discussed the used of azimuthal receivers. Other methods used the individual azimuthal receivers to determine the azimuth of the reflectors. Bennett et al. (Bennett N., Donald J. A., Ghadiry S., Nassa M., Kumar R. and Biswas R., 2019, *Borehole acoustic imaging using 3D STC and ray tracing to determine far-field reflector dip and azimuth*, Petrophysics, Vol. 60, 335-347) and Bennett (Bennett, N., 2019, *3D slowness time coherence for sonic imaging*, Geophysics, vol 84, 5, D179-D189) introduced 3D slowness semblance time coherence to identify the reflectors and drive the migration. All these works will benefit from the present interpolation method. Also, note that none of these methods mention rotation. Lastly, yet another benefit of the present disclosure is the generation of quadrupole and hexapole data.

Embodiments and methods of the present disclosure described herein further relate to any one or more of the following paragraphs:

1. A method to determine one or more characteristics of a hydrocarbon-bearing formation, the method comprising obtaining, using a logging tool having one or more transmitters and receivers positioned within a borehole of the formation, one or more acoustic multicomponent measurements; using an orientation sensor to obtain an orientation measurement of the logging tool; assigning the multicomponent measurements to a fixed coordinate using the orientation measurement, the multicomponent measurements having a first azimuthal coverage, wherein an interpolation technique is applied to the multicomponent measurements to increase azimuthal coverage to a second azimuthal coverage and thereby generate interpolated multicomponent measurements at fixed azimuths; and processing the interpolated multicomponent measurements to determine one or more characteristics of the formation.

2. The method as defined in paragraph 1, wherein the transmitter is a monopole, a dipole or a unipole.

3. The method as defined in paragraphs 1 or 2, wherein the receiver is a monopole, dipole or unipole.

4. The method as defined in any of paragraphs 1-3, wherein the interpolation technique is a Fast Fourier Transform, Inverse Distance Weighted, Spline, Kriging, or Discrete is Smooth technique.

5. The method as defined in any of paragraphs 1-4, wherein the transmitters are cross-dipoles transmitters and the receivers are unipole receivers; and the interpolation technique applies a two-dimensional Fast Fourier Transform which considers a wavenumber index of the transmitters and receivers.

6. The method as defined in any of paragraphs 1-5, wherein the transmitter is a monopole transmitter and the receivers are unipole receivers; and the interpolation technique applies a one-dimensional Fast Fourier Transform which considers a wavenumber index of the transmitters and receivers.

7. The method as defined in any of paragraphs 1-6, wherein applying the interpolation technique comprises constructing a first matrix of the multicomponent measurements in a space-time domain; performing a Fast Fourier Transform of the first matrix to obtain a second matrix in a wavenumber-wavenumber domain, wherein the multicomponent measurements are interpolated in the wavenumber-wavenumber domain and a phase shift with zero padding is applied; and performing an inverse Fast Fourier Transform of second matrix to obtain a third matrix in the space-time domain, wherein the multicomponent data of the third matrix is the interpolated multicomponent data.

8. The method as defined in any of paragraphs 1-7, wherein determining the one or more characteristics of the formation comprises determining shear slowness of the formation; or imaging the formation.

9. A system to determine one or more characteristics of a hydrocarbon-bearing formation, the system comprising a logging tool having one or more transmitters and receivers, the logging tool being positioned within a borehole of the formation and operable to obtain one or more acoustic multicomponent measurements; an orientation sensor to obtain an orientation measurement of the logging tool; and processing circuitry communicably coupled to the logging tool and orientation sensor, the processing circuitry operable to perform operations comprising: assigning the multicomponent measurements to a fixed coordinate using the orientation measurement, the multicomponent measurements having a first azimuthal coverage, wherein an interpolation technique is applied to the multicomponent measurements to increase azimuthal coverage to a second azimuthal coverage and thereby generate interpolated multicomponent measurements at fixed azimuths; and processing the interpolated multicomponent measurements to determine one or more characteristics of the formation.

10. The system as defined in paragraph 9, wherein the transmitter is a monopole, a dipole or a unipole.

11. The system as defined in paragraphs 9 or 10, wherein the transmitter is a monopole, a dipole or a unipole.

12. The system as defined in any of paragraphs 9-11, wherein the interpolation technique is a Fast Fourier Transform, Inverse Distance Weighted, Spline, Kriging, or Discrete Smooth technique.

13. The system as defined in any of paragraphs 9-12, wherein the transmitters are cross-dipoles transmitters and the receivers are unipole receivers; and the interpolation technique applies a two-dimensional Fast Fourier Transform which considers a wavenumber index of the transmitters and receivers.

14. The system as defined in any of paragraphs 9-13, wherein the transmitter is a monopole transmitter and the receivers are unipole receivers; and the interpolation technique applies a one-dimensional Fast Fourier Transform which considers a wavenumber index of the transmitters and receivers.

15. The system as defined in any of paragraphs 9-14, wherein applying the interpolation technique comprises constructing a first matrix of the multicomponent measurements in a space-time domain; performing a Fast Fourier Transform of the first matrix to obtain a second matrix in a wavenumber-wavenumber domain, wherein the multicomponent measurements are interpolated in the wavenumber-wavenumber domain and a phase shift with zero padding is applied; and performing an inverse Fast Fourier Transform of second matrix to obtain a third matrix in the space-time domain, wherein the multicomponent data of the third matrix is the interpolated multicomponent data.

Furthermore, the exemplary methodologies described herein may be implemented by a system including processing circuitry or a non-transitory computer program product including instructions which, when executed by at least one processor, causes the processor to perform any of the methodology described herein.

Although various embodiments and methodologies have been shown and described, the invention is not limited to such embodiments and methodologies and will be understood to include all modifications and variations as would be apparent to one skilled in the art. Therefore, it should be understood that the invention is not intended to be limited to the particular forms disclosed. Rather, the intention is to cover all modifications, equivalents and alternatives falling within the spirit and scope of the invention as defined by the appended claims.

What is claimed is:

1. A method to determine one or more characteristics of a hydrocarbon-bearing formation, the method comprising:
    obtaining, using a logging tool having one or more transmitters and receivers positioned within a borehole of the formation, one or more acoustic multicomponent measurements;
    using an orientation sensor to obtain an orientation measurement of the logging tool;
    assigning the multicomponent measurements to a fixed coordinate using the orientation measurement, the multicomponent measurements having a first azimuthal coverage, wherein an interpolation technique is applied to the multicomponent measurements to increase azimuthal coverage to a second azimuthal coverage and thereby generate interpolated multicomponent measurements at fixed azimuths, wherein the interpolation technique applies a two-dimensional Fast Fourier Transform which considers a wavenumber index of the transmitters and receivers; and processing the interpolated multicomponent measurements to determine one or more characteristics of the formation.

2. The method as defined in claim 1, wherein the transmitter is a monopole, a dipole or a unipole.

3. The method as defined in claim 1, wherein the receiver is a monopole, dipole or unipole.

4. The method as defined in claim 1, wherein the interpolation technique is a Fast Fourier Transform, Inverse Distance Weighted, Spline, Kriging, or Discrete Smooth technique.

5. The method as defined in claim 1, wherein:
the transmitters are cross-dipoles transmitters and the receivers are unipole receivers.

6. The method as defined in claim 1, wherein:
the transmitter is a monopole transmitter and the receivers are unipole receivers; and
the interpolation technique applies a one-dimensional Fast Fourier Transform which considers a wavenumber index of the transmitters and receivers.

7. The method as defined in claim 1, wherein applying the interpolation technique comprises:
constructing a first matrix of the multicomponent measurements in a space-time domain;
performing a Fast Fourier Transform of the first matrix to obtain a second matrix in a wavenumber-wavenumber domain, wherein the multicomponent measurements are interpolated in the wavenumber-wavenumber domain and a phase shift with zero padding is applied; and
performing an inverse Fast Fourier Transform of second matrix to obtain a third matrix in the space-time domain,
wherein the multicomponent data of the third matrix is the interpolated multicomponent data.

8. The method as defined in claim 1, wherein determining the one or more characteristics of the formation comprises:
determining shear slowness of the formation; or
imaging the formation.

9. A system to determine one or more characteristics of a hydrocarbon-bearing formation, the system comprising:
a logging tool having one or more transmitters and receivers, the logging tool being positioned within a borehole of the formation and operable to obtain one or more acoustic multicomponent measurements;
an orientation sensor to obtain an orientation measurement of the logging tool; and
processing circuitry communicably coupled to the logging tool and orientation sensor, the processing circuitry operable to perform operations comprising:
assigning the multicomponent measurements to a fixed coordinate using the orientation measurement, the multicomponent measurements having a first azimuthal coverage, wherein an interpolation technique is applied to the multicomponent measurements to increase azimuthal coverage to a second azimuthal coverage and thereby generate interpolated multicomponent measurements at fixed azimuths, wherein the interpolation technique applies a two-dimensional Fast Fourier Transform which considers a wavenumber index of the transmitters and receivers; and
processing the interpolated multicomponent measurements to determine one or more characteristics of the formation.

10. The system as defined in claim 9, wherein the transmitter is a monopole, a dipole or a unipole.

11. The system as defined in claim 9, wherein the transmitter is a monopole, a dipole or a unipole.

12. The system as defined in claim 9, wherein the interpolation technique is a Fast Fourier Transform, Inverse Distance Weighted, Spline, Kriging, or Discrete Smooth technique.

13. The system as defined in claim 9, wherein:
the transmitters are cross-dipoles transmitters and the receivers are unipole receivers.

14. The system as defined in claim 9, wherein:
the transmitter is a monopole transmitter and the receivers are unipole receivers; and
the interpolation technique applies a one-dimensional Fast Fourier Transform which considers a wavenumber index of the transmitters and receivers.

15. The system as defined in claim 9, wherein applying the interpolation technique comprises:
constructing a first matrix of the multicomponent measurements in a space-time domain;
performing a Fast Fourier Transform of the first matrix to obtain a second matrix in a wavenumber-wavenumber domain, wherein the multicomponent measurements are interpolated in the wavenumber-wavenumber domain and a phase shift with zero padding is applied; and
performing an inverse Fast Fourier Transform of second matrix to obtain a third matrix in the space-time domain,
wherein the multicomponent data of the third matrix is the interpolated multicomponent data.

16. A non-transitory computer program product including a computer-readable medium storing instructions which, when executed by at least one processor, causes the processor to perform a method comprising:
obtaining, using a logging tool having one or more transmitters and receivers positioned within a borehole of the formation, one or more acoustic multicomponent measurements;
using an orientation sensor to obtain an orientation measurement of the logging tool;
assigning the multicomponent measurements to a fixed coordinate using the orientation measurement, the multicomponent measurements having a first azimuthal coverage, wherein an interpolation technique is applied to the multicomponent measurements to increase azimuthal coverage to a second azimuthal coverage and thereby generate interpolated multicomponent measurements at fixed azimuths, wherein the interpolation technique applies a two-dimensional Fast Fourier Transform which considers a wavenumber index of the transmitters and receivers; and
processing the interpolated multicomponent measurements to determine one or more characteristics of the formation.

17. The computer program product as defined in claim 16, wherein the transmitter is a monopole, a dipole or a unipole.

18. The computer program product as defined in claim 16, wherein the transmitter is a monopole, a dipole or a unipole.

19. The computer program product as defined in claim 16, wherein the interpolation technique is a Fast Fourier Transform, Inverse Distance Weighted, Spline, Kriging, or Discrete Smooth technique.

20. The computer program product as defined in claim 16, wherein applying the interpolation technique comprises:
- constructing a first matrix of the multicomponent measurements in a space-time domain;
- performing a Fast Fourier Transform of the first matrix to obtain a second matrix in a wavenumber-wavenumber domain, wherein the multicomponent measurements are interpolated in the wavenumber-wavenumber domain and a phase shift with zero padding is applied; and
- performing an inverse Fast Fourier Transform of second matrix to obtain a third matrix in the space-time domain,
- wherein the multicomponent data of the third matrix is the interpolated multicomponent data.

* * * * *